(12) United States Patent
Horton

(10) Patent No.: US 6,800,843 B2
(45) Date of Patent: Oct. 5, 2004

(54) DISPLACEMENT AND TORQUE SENSOR

(75) Inventor: Steven John Horton, West Midlands (GB)

(73) Assignee: TRW LucasVarity Electric Steering Limited (GB)

( * ) Notice: Subject to any disclaimer, the term of this patent is extended or adjusted under 35 U.S.C. 154(b) by 0 days.

(21) Appl. No.: 10/672,296

(22) Filed: Sep. 26, 2003

(65) Prior Publication Data

US 2004/0118999 A1 Jun. 24, 2004

Related U.S. Application Data (63) Continuation of application No. PCT/GB02/01427, filed on Mar. 27, 2002.

(30) Foreign Application Priority Data

Mar. 27, 2001 (GB) .............................................. 0107605

(51) Int. Cl.$^7$ ................................................. G01D 5/34
(52) U.S. Cl. ........................... 250/231.13; 250/231.14; 250/231.18; 341/13
(58) Field of Search ........................ 250/231.13, 231.14, 250/231.18; 356/614, 616, 617; 33/706–707; 341/11, 13, 31; 73/1.75, 1.79

(56) References Cited

U.S. PATENT DOCUMENTS

| | | | | | |
|---|---|---|---|---|---|
| 4,654,524 A | * | 3/1987 | Kita | ....................... | 250/231.14 |
| 5,438,193 A | * | 8/1995 | Takagi et al. | .......... | 250/231.18 |
| 5,841,132 A | * | 11/1998 | Horton et al. | ......... | 250/231.13 |
| RE37,969 E | * | 1/2003 | Horton et al. | ......... | 250/231.13 |

FOREIGN PATENT DOCUMENTS

| | | | |
|---|---|---|---|
| EP | 1 001 256 A | 5/2000 | |
| WO | WO 01/18492 A | 3/2001 | |

* cited by examiner

Primary Examiner—David Porta
Assistant Examiner—Patrick J. Lee
(74) Attorney, Agent, or Firm—MacMillan, Sobanski & Todd, LLC (57) ABSTRACT

An optical displacement senor includes a source of optical radiation, a two-dimensional array of radiation detectors, and at least one modulating element disposed between the source and detector. The modulating element has alternating first and second modulating regions circumfrentially spaced around a central axis thereof. The modulating element is displacement relative to the array of detectors so that the detector array forms a two-dimensional image of the first and second regions of the modulating element of array. A data processor is connected to the detector array and is adapted to indentify the orientation of at least two different radially extending edges of regions on the modulating element from the two-dimensional image and also to determine the position of the centre of the element from the determined orientation of the edges.

13 Claims, 7 Drawing Sheets

DISPLACEMENT AND TORQUE SENSOR

CROSS REFERENCE TO RELATED APPLICATIONS

This application is a continuation of International Application No. PCT/GB02/01427 filed Mar. 27, 2002, the disclosures of which are incorporated herein by reference, which claimed priority to Great Britain Patent Application No. 0107605.8 filed Mar. 27, 2001, the disclosures of which are also incorporated herein by reference.

This invention relates to a displacement sensor and to a torque sensor. It in particular relates to an angular displacement sensor. The sensor is suitable for use within a vehicle electric power assisted steering system (EPAS).

BACKGROUND OF THE INVENTION

EP1001256A1, which is incorporated by reference herein, discloses a torque sensor 100 in which two disks 101, 102 are mounted in close proximity and attached to the respective ends of a torque transmitting shaft. Both of the discs 101, 102 carry a set of circumferentially spaced slots 103, 104, and the slots in each of the two discs co-operate to define apertures for the passage of light. A light source 10 is provided to one side of the first disk to emit light through the slots in the first disk and the slots in the second disk onto an optical detector 106 provided on the other side of the disks. As torque is applied to the torque transmitting shaft relative motion between the two discs alters the way in which the slots overlap and hence the size of the apertures which control the pattern of light incident upon the optical detector.

The optical detector comprises a one-dimensional array of detector elements and the output from the array is passed to a processor operative to determine the relative positions of the two discs by determining the relative positions of transitions from light to dark in the pattern formed on the detector array. Each transition corresponds to an edge of a slot in one of the discs. In practice, five edges must be imaged onto the linear array in order to unambiguously determine the relative position of the two discs. This provides an indication of the torque applied to the shaft corresponding to the received pattern on the array.

If the torsion bar is omitted, the two disks allow the device to be used as simple angular displacement sensor. In a further modification, a single disk may be provided which results in a simple rotary position sensor. The present invention relates to all three types of sensor In a linear array sensor the torque is typically derived from the relative angular position of wide and narrow spokes on two modulating disks. Unfortunately, a problem can arise with a torque sensor (or angular displacement or rotary position sensor) of this type if the two discs are not accurately aligned. This may occur due to bending of the torque transmitting shaft or perhaps due to misalignment during manufacture of a sensor. If only a single linear array is used, the effect is for the slots of one (or both) disks to move longitudinally along the array. The run out due to this type of misalignment will produce a sinusoidal variation in the measured torque over a complete revolution of the discs which cannot be differentiated with a single array.

Figure 1:
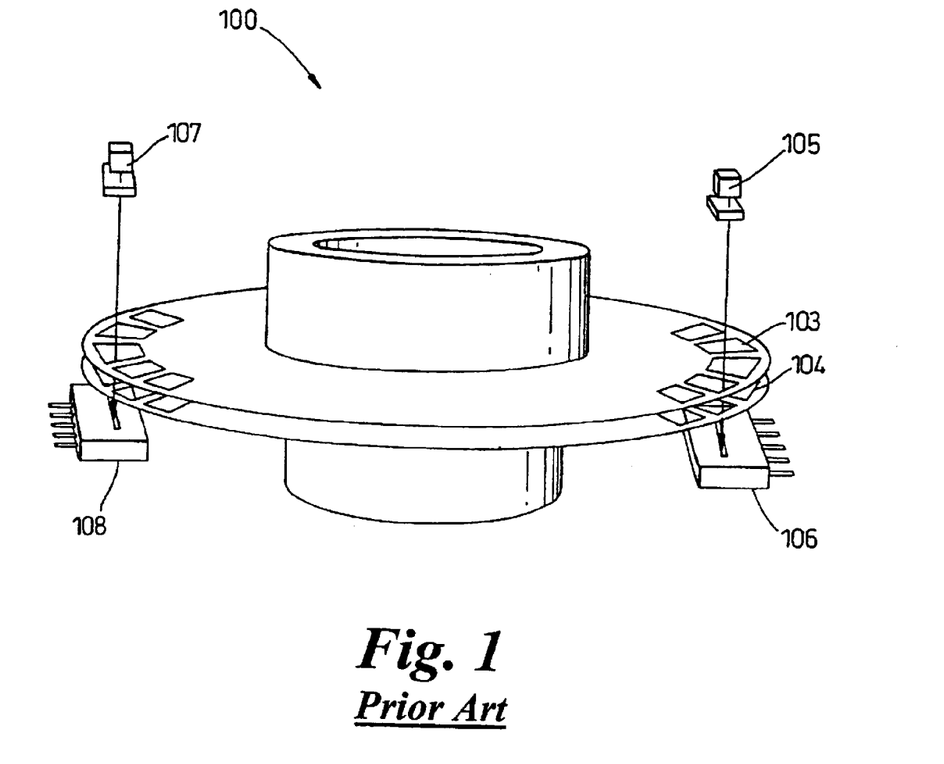
FIG. 1 is a perspective diagram of a prior art torque sensor.

EP 1001256 A1 teaches a solution to this problem. Two light sources 105, 107 are provided which are arranged at diametrically opposed locations on the disks with each light source transmitting light through the apertures defined by the two disks onto a respective linear array 106, 108. A prior art sensor of this type is illustrated in FIG. 1 of the accompanying drawings.

Each linear array 106, 108 provides an output indicative of the light pattern formed on the array to a processor which calculates torque value from each pattern. The sinusoidal error due to run-out can then be compensated by taking the average of the two torque values. This effectively makes the sensor immune to disk run-out errors.

Figure 7:
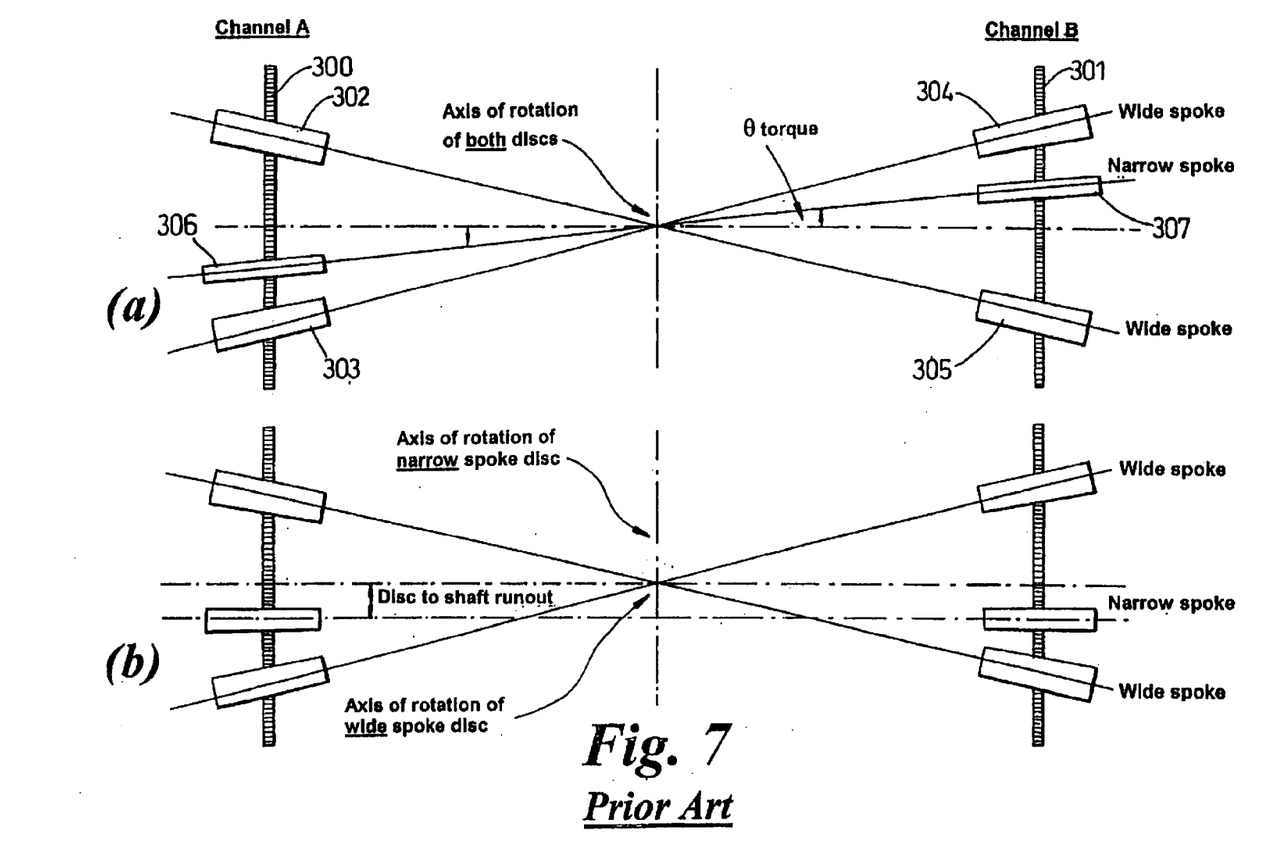

For example, FIG. 7c of the accompanying drawings shows the position of two arrays 300, 301 on opposing sides of the modulating disks. Two wide spokes 302, 303 are imaged onto the first array 300 and two more wide spokes 304, 305 onto the second array 301. On each array a narrow spoke 306, 307 is also imaged.

Similarly, FIG. 7(b) shows the same spokes imaged onto the two arrays. In FIG. 7(a) the narrow spoke disc is rotated relative to the wide spoke disk due to an applied torque but in FIG. 7(b) the arrays "see" the same result due to run out of the narrow spoke disc with no applied torque.

Since two arrays are provided, the results of the determined torque can be arranged to remove the effect of the run-out, and distinguish FIG. 7(a) from FIG. 7(b). Nevertheless, an error may still exist since it is necessary to determine the torque by performing an arctan calculation to convert the linear array measurements into angular measurements. This requires the exact centre of the modulating disks to be assumed to pass through the centre of the linear arrays. Clearly, this is not in fact true where run-out is present and so performance is degraded.

The provision of linear arrays at two diametrically opposed positions in the sensor increases the overall cost of the design. The relative location of each of the arrays must be maintained with great accuracy throughout the life of the device. Separate connections from the two arrays to the processor are required and the number of light sources is also doubled compared to a simple one-array device.

SUMMARY OF THE INVENTION

It is the object of this invention to ameliorate some of the problems associated with the prior art displacement and torque sensors.

In accordance with a first aspect the invention provides an optical displacement sensor comprising a source of optical radiation, an array of radiation detectors, at least one modulating element having alternating first and second modulating regions circumferentially spaced around a central axis of the element, the first and second regions having different optical characteristics and the transition between adjacent first and second regions being defined by a substantially radially extending edge, the modulating element being displaceable relative to the array of detectors so that the first and second regions are exposed to optical radiation from the source and pass by the detector array to form an image of said first and second regions of the modulating element on the array, a data processor connected to the detector array to receive therefrom respective signals dedpendent upon the of radiation falling on the detectors, and characterised in that:

the detector array comprises a two-dimensional array of detector elements which produces a two-dimensional image of the first and second regions;

the processor is adapted to identify the orientation of at least two different radially extending edges of regions on the at least one modulating element from the two-dimensional image and to determine the position of the centre of the element from the determined orientation of the edges.

The signals produced by the data processor are most preferably dependent upon the intensity of radiation falling upon the detectors.

In the prior art a single one-dimensional array is provided which allows the presence of an edge to be identified but not its orientation in space. This does not allow the position of the centre of the first element to be determined.

The modulating element may include a third modulating region that is distinct from the first and second modulating regions (i.e. wider, different optical characteristics). This can be used as a position index spoke.

Preferably the processor is adapted to identify in the two dimensional image at least two radially spaced portions of each identified edge from the image captured by the detector array.

The processor may be adapted to determine the orientation of a detected edge by generating a vector which passes through the two identified portions.

By two dimensional array we mean an array which can image at least two different radially spaced portions on an edge of a modulating region.

By providing a two dimensional array it is possible to capture at least two radially spaced points of the same edge and hence determine the orientation of the edge.

The two dimensional array may conveniently comprise two sub-arrays with each sub-array comprising a linear array of detector elements. The two arrays may be substantially identical. They may be arranged in parallel and in close proximity on one side of the modulating element central axis. Most conveniently, to assist in detection of edges which are imaged onto both sub-arrays the spacing between the detectors of the two arrays is smaller than the angular spacing between the edges that are to be identified. Other arrangements include, for example, a 128×16 array in which it is possible to detect 16 different radially spaced portions on an edge of a modulating region.

Where two sub-arrays are provided, each array may be adapted to generate a respective sub-image which is passed to the processor. Each of the two sub-images corresponds to a different portion of the first and second region. Preferably, the sub-images are captured at the same instant in time, or at substantially the same instant in time.

The processor may comprise means for identifying the orientation of the edges by identifying the position of an inner portion of a first edge of the modulating regions in the first image and the position of an outer portion of the first edge in the second image, means for identifying the position of an inner portion of a second edge of the modulating regions in the first image and the position of an outer portion of the second edge from the second image, orientation determining means for determining the orientation of the two edges from the relative positions of the portions in the first and second images; and position determining means for determining the position of the centre of the modulating element from the determined orientation of the two identified edges.

A pair of closely spaced linear arrays thus provides sufficient information to permit the position of the modulating element to be identified by determining the orientation of two different edges of the modulating regions on the desk. This enables errors in the centre output due to run out of the modulating element to be compensated. It also permits the optical radii of the modulating element to be derived.

The processor may be adapted to determine the centre of rotation of both of the first and the second elements by identifying the orientation of at least two edges on each of the elements.

Each first region of the first and second modulating elements may comprise a radially extending slot formed between circumferentially spaced radially extending edges.

The second regions between the slots may be opaque. This arrangement is preferred as it provides the maximum intensity difference between the light and dark portions of the image on the array. It is the transition from one intensity level to the other in the image that is used to identify the position of an edge.

It is preferred that the spatial extent of the two-dimensional array is such that, in use, at least five transitions between first and second intensity thresholds will always be detectable by each array. This corresponds to the detection of at least five edges.

The light source and the detector array may be provided on opposite sides of the modulating element to form a transmissive type sensor. Alternatively, the light source and the detector array may be provided on the same side of the modulating elements. In the first case light from the source is either passed through to the detector array or blocked by the modulating regions. In the second case, light from the source may be either reflected from the modulating regions onto the detector array or passes through the modulating regions away from the detector array.

The skilled man will understand that many modifications to the sensor are possible within theses two broad types.

It is preferred that the light source is at least partially diffuse. Alternatively, a point source may be used in combination with a diffuser provided in front of the light source.

First and second modulating elements may be provided. Each may have first and second modulating regions which overlap, the first modulating element being displacable relative to the second modulating element. They may be connected at axially spaced locations along a torsion bar.

The first modulating element may be attached to an input shaft and the second modulating element may be attached to an output shaft, the input and output shaft being connected by a torsion bar. In this arrangement a torque applied to the torsion bar will produce the relative angular displacement of the first and second elements.

A sensor of this type allows torque to be measured.

Thus, in accordance with a second aspect the invention provides a torque sensor comprising a displacement sensor according to the first aspect of the invention in which the first element and the second element are connected by a torsion bar.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 7(a) and (b) illustrate the effect of an applied torque and a disk run-out error on the images formed in a prior art torque sensor.

DETAILED DESCRIPTION OF THE INVENTION

Figure 2:
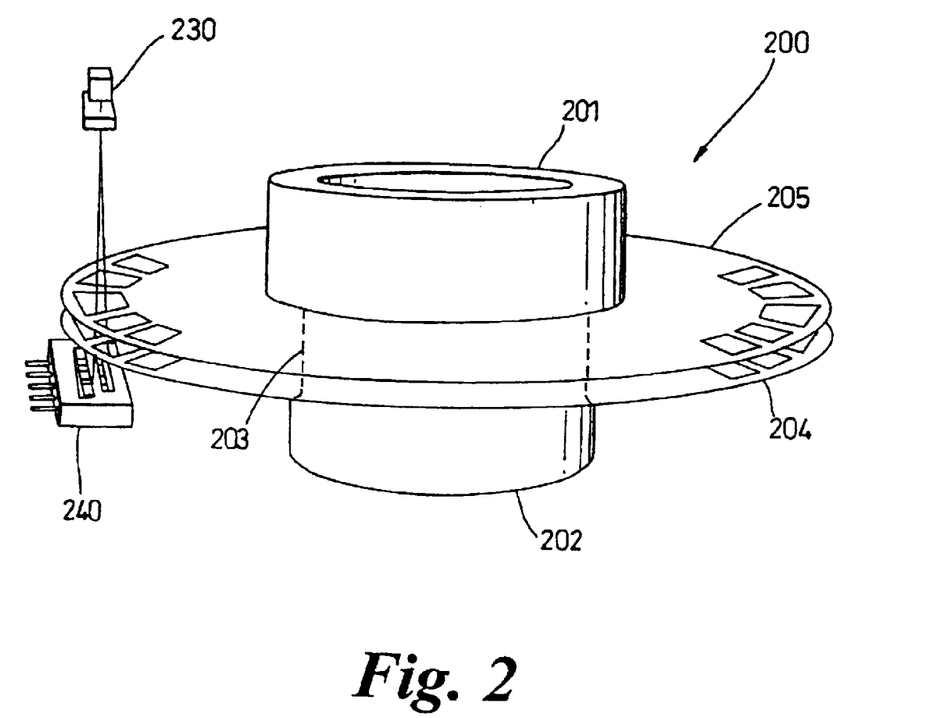
FIG. 2 is a perspective diagram of a torque sensor forming an embodiment of the present invention.

As shown in FIG. 2 of the accompanying drawings, a torque sensor 200 is provided which comprise an input shaft 201 coupled to an output shaft 202 via a torque transmitting shaft 203 axial with the input and output shafts. The torque transmitting shaft, sometimes known as a quill shaft or torsion bar. The torsion bar would be shielded from view, but is indicated by a broken line so as to illustrate the internal structure of the arrangement. First and second modulating 204, 205 elements, each comprising a disk, are carried respectively by the input and output shafts.

Figure 3:
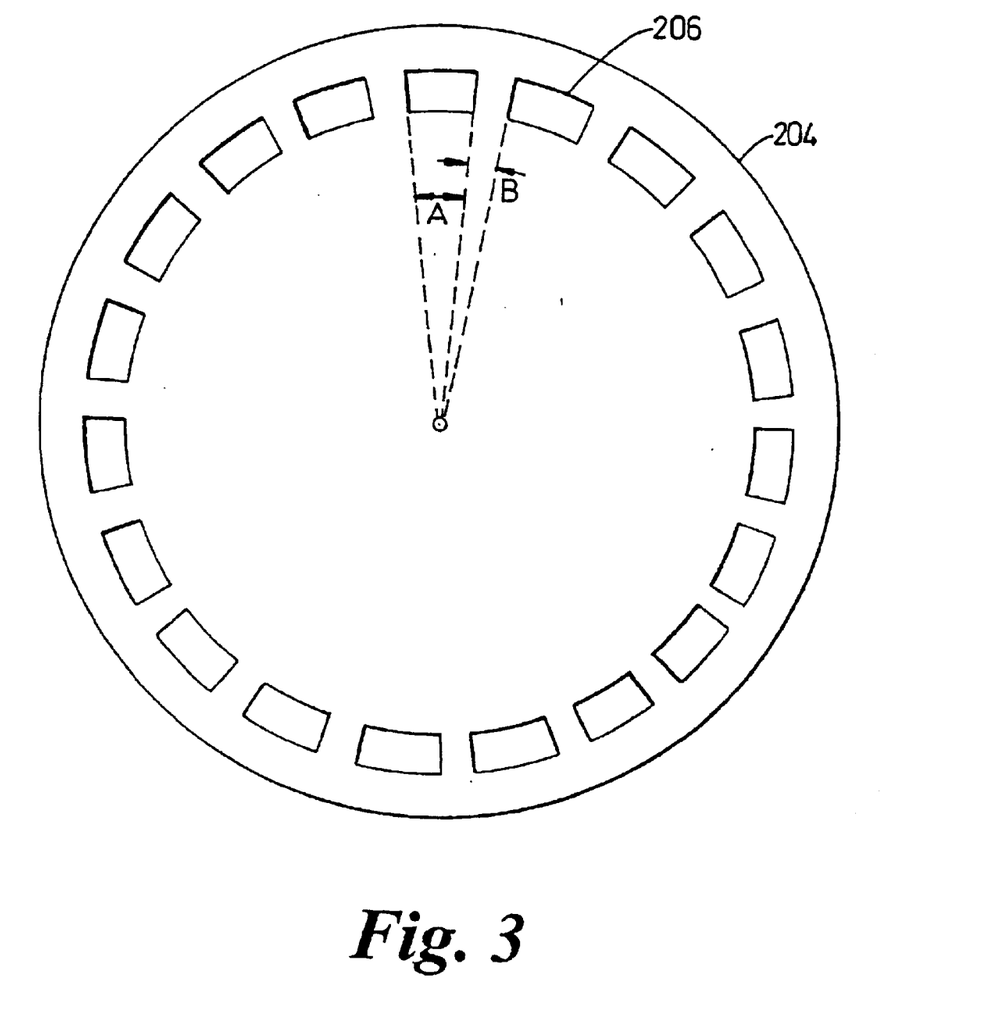
FIG. 3 is a plan view of a first modulating element of the sensor of FIG. 2 which includes a wider spoke between each slot.
Figure 4:
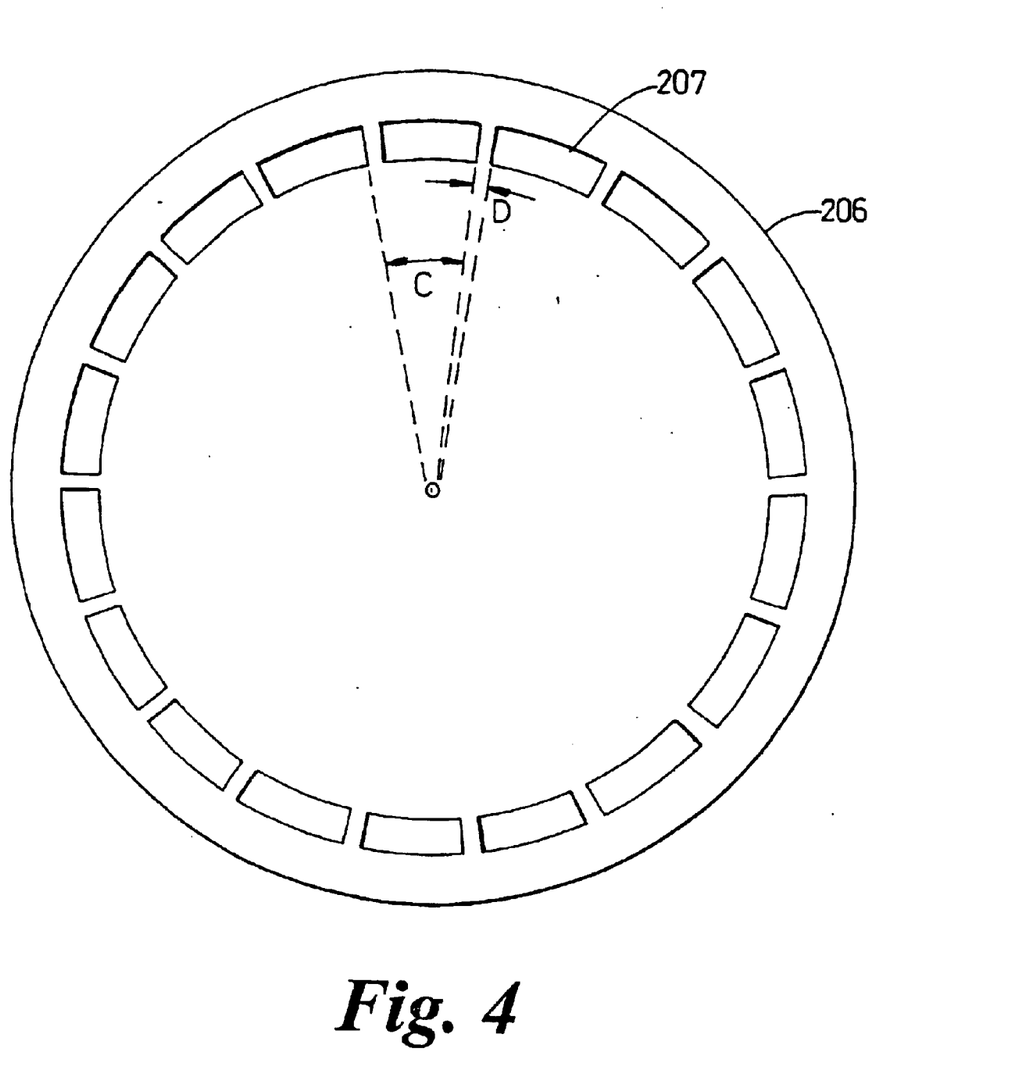
FIG. 4 is a plan view of a second modulating element of the sensor of FIG. 2 which includes a narrow spoke between each slot.

FIGS. 3 and 4 of the accompanying drawings illustrate in part-plan view the first and second modulating elements 204, 205. Each element carries a set of radially extending circumferentially spaced slots 206, 207 formed therein. Each slot is relatively thin and extends in an arc following the circumference of the disk. The slots are separated by spokes. Each slot is bounded by a straight edge which extends radially such that a vector including the edge will pass through the centre of the disk. In the example shown one of the disks is provided with wider spokes than the other disk although it is possible to construct a sensor in which the width of the slots is the same on each disk. The use of different width spokes permits negative torques to be distinguished from positive torques.

In use, the two disks 204, 205 are aligned about a common axis so that the slots of the first disk 204 overlap with the slots of the second disk 205. The two sets of slots move relative to one another as torque is applied to the torsion bar. This causes the pattern of light which is permitted to pass through the slots to vary as the inter-slot portions of the two disks overlap one another by varying amounts. This aspect of the invention is well known and the reader is directed to the teachings of EP1001256A1 for a full discussion of the different patterns that may be produced for different slot arrangements.

Figure 5:
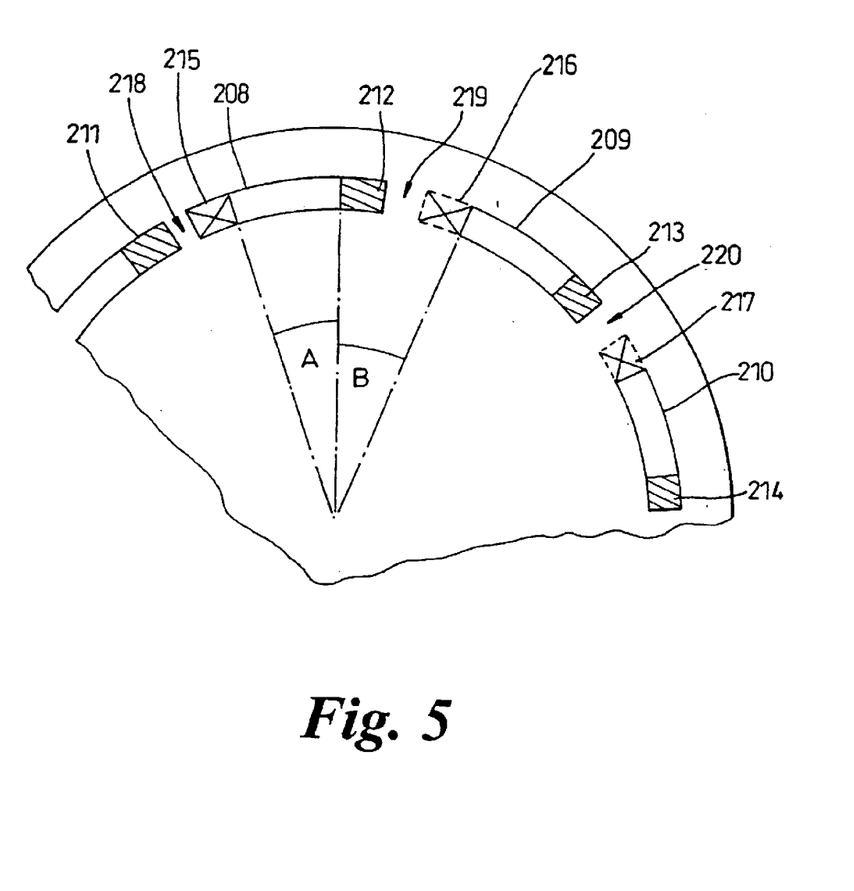
FIG. 5 illustrates an example of the formation of apertures by the slots in the two disks for an arbitrary torque applied to the sensor torsion bar.

By way of example only, FIG. 5 illustrates the pattern produced from the two disks of FIGS. 3 and 4 for the case of an arbitrarily selected torque. It can be seen that the overlap between the slots defines apertures where two slots overlap. Between these apertures are regions where one slot of the first disc overlaps an inter-slot portion (spoke), regions 215, 216. 217 where a slot of the second disk overlaps an interslot region of the first disk and also regions 218, 219, 220 where two interslot portions overlap. It is notable that the edges of each transition in the pattern from an aperture to an inter-aperture region extend radially and correspond to an edge of a slot on one or other of the two disks. As the torque is varied the pattern also changes with the width of the apertures and the interaperture regions being a function of the torque.

As shown in FIG. 2 both of the discs are interposed between a light source 230 (which may emit visible, infrared or ultraviolet light) and a two dimensional array of detector elements 240. The light from the source produces an image of the pattern formed by the slots in the disks on the detector array 240.

Figure 6:
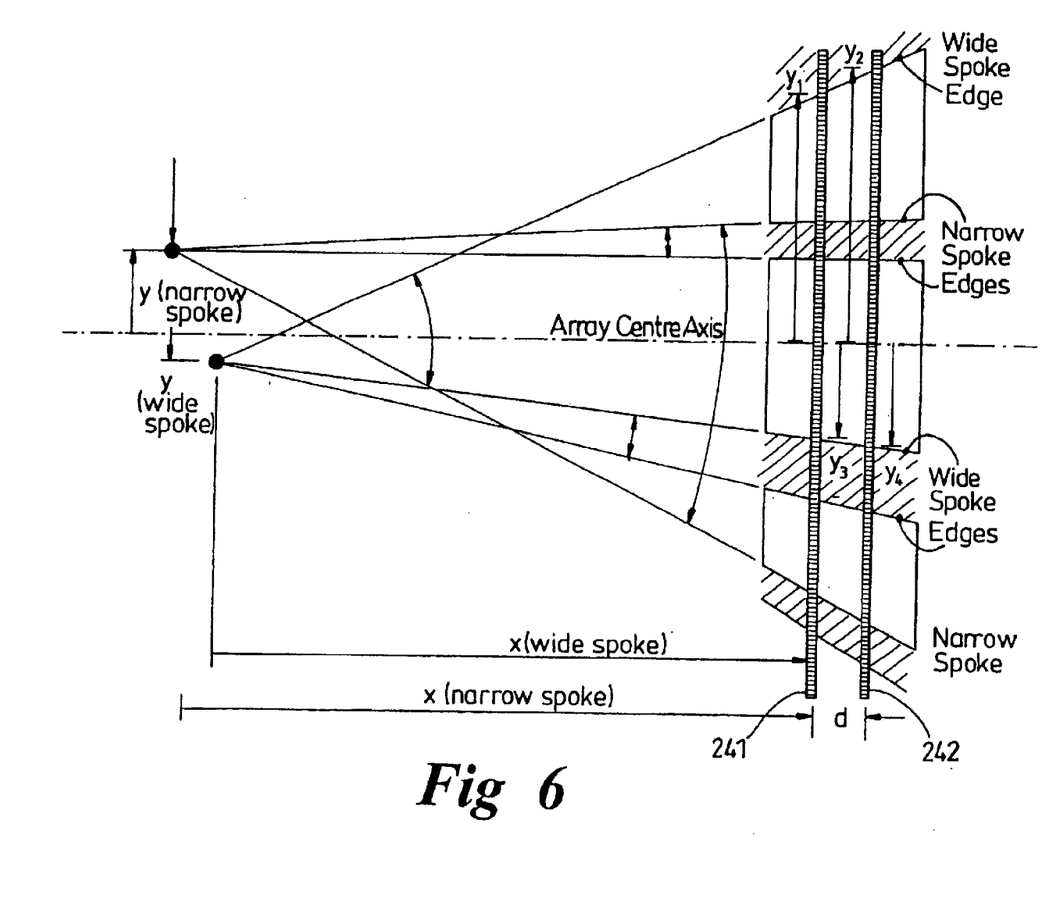
FIG. 6 illustrates the superposition of a two-dimensional image formed on the first and second detectors for the arrangement of FIG. 2 and also the vectors of edges identified from the image.

The array of detector elements 240 is illustrated in FIG. 6 of the accompanying drawings. It comprises a single chip device defining two linear arrays 241, 242 of detectors on a common substrate. Each detector in an array is sensitive to the light emitted by the light source. The two linear arrays arranged are in parallel. The spacing between the two arrays is chosen to be less than the radial extent of the edges of the modulating slots in the two disks. Additionally, the extent of the two arrays is chosen such that an image of five edges of the modulating regions is always formed on each of the sub-arrays. Each array comprises 128 detectors, although more or less may be provided.

Also shown in FIG. 6 is the formation of an optical pattern onto the two linear arrays by the light passing through the apertures formed by the modulating elements. As can be seen, each linear array "sees" a one-dimensional image of the pattern formed by the slots which is offset from a corresponding image "seen" by the other linear array. Together, these images form a two-dimensional image of the pattern of apertures formed by slots in the modulating elements.

Each of the images is passed to a processor (not shown) which extracts from the images the location of transitional points in the image. Each of these identified transition locations represents edges of the apertures formed by the slots in the modulating elements. Having identified each transitional location in the two images the processor groups the locations into pairs, with each pair corresponding to a common edges of a slot in one of the two disks. Having grouped the transitions into pairs a vector is determined for the edge that corresponds to the pair of transitions.

Having generated a set of vectors corresponding to the orientation of edges of the modulating slots the processor next determines the centre of each of the disks by extrapolating two edges for each disk to their point of overlap.

The process used for the determination of the centre point can best be understood with reference to FIG. 6 of the accompanying drawings.

Considering the first modulating element which has the widest slots for example:

$Y_1$ is an edge position for a wide spoke measured on array 241

$Y_2$ is an edge position for a wide spoke measured on array 242

$Y_3$ is an edge position for an adjacent wide spoke on measured array 241

$Y_4$ is an edge position for adjacent wide spoke on measured array 242

X is the optical radius for the wide spoke disk and array 241 d is the distance between linear array 241 and linear array 242 y is the tangential displacement between the array centre axis and the wide spoked disk centre.

Using the above notation it can be shown that the optical radius x of the wide spokes dish is given by the equation:

$$x = \frac{d(y_3 - y_1)}{y_2 + y_3 - y_1 - y_4} + 1$$

The value of x may be used by the processor to determine the optical magnification of each of the elements which is used for arctan and parallax edge correction as set out in our earlier European patent application EP1001256A1.

It can also be shown that the tangential displacement y of the wide spoke disc is given by the equation:

$$y = \frac{y_1 \cdot y_4 - y_3 \cdot y_2}{y_1 + y_4 - y_2 - y_3}$$

These equations can equally be used to calculate the centre position for the second element which has the narrow slots.

After applying a correction to the images the torque is finally determined from the corrected widths of the apertures and inter aperture regions.

The y factor can be used to adjust the original edge position values (y1 . . . y4) to compensate for disk run-out. This adjustment should be made before the arctan and parallax corrections are applied to the slot edge positions.

It should be noted that the equations do not require accurate tangential or yaw placement of the linear array device, i.e. the y correction factor automatically lines up the centre of each disk with the centre of the array. Also the correction factor gives optimal arctan correction for all disk positions rather than being optimised for a particular disk orientation.

It should also be noted that the first equation gives optical radius without having to solve the square root of a quadratic equation, which is required with the sensor apparatus known in the prior art.

In a refinement, the processor monitors the displacement of the calculated centre of the disk relative to a presumed rotation of axis for the torsion bar. In the event that the calculated centre straight from the presumed axis by an amount in excess of a predetermined safe limit a warning flag may be raised.

It will, of course, the understood that the invention is not limited in any way to the specific embodiment described hereinabove. The invention provides a displacement centre which uses rotating modulating disks together with the appropriate detector array to enable the amount of run-out of one or both of the disks to be compensated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An optical displacement sensor comprising:
   a source of optical radiation;
   an array of radiation detectors, the detector array including a two-dimensional array of detector elements;
   at least one modulating element disposed between the source of optical radiation and the array of radiation detector, said modulating element having alternating first and second modulating regions circumferentially spaced around a central axis of the element, the first and second regions having different optical characteristics and the transition between adjacent first and second regions being defined by a substantially radially extending edge, the modulating element being displaceable relative to the array of detectors so that the first and second regions are exposed to optical radiation from the source and pass by the two-dimensional detector array of elements to cause the detector array to form a two dimensional image of said first and second regions of the modulating element on the array;
   a data processor connected to the detector array to receive therefrom respective signals dependent upon the radiation falling on the detectors, the processor being adapted to identify the orientation of at least two different radially extending edges of regions on the at least one modulating element from the two-dimensional image produced by the detector array and to determine the position of the centre of the element from the determined orientation of the edges.

2. An optical displacement sensor according to claim 1 in which the modulating element includes a third modulating region that is distinct from the first and second modulating regions.

3. An optical displacement sensor according to claim 1 in which the processor is adapted to identify in the two dimensional image at least two radially spaced portions of each identified edge from the image captured by the detector array.

4. An optical displacement sensor according to claim 3 in which the processor is adapted to determine the orientation of a detected edge by generating a vector which passes through the two identified portions.

5. An optical displacement sensor according to claim 1 in which the two dimensional array comprises two sub-arrays with each sub-array comprising a linear array of detector elements.

6. An optical displacement sensor according to claim in which the spacing between the detectors of the two sub-arrays is smaller than the angular spacing between the edges that are to be identified.

7. An optical displacement sensor according to claim 6 in which each sub-array is adapted to generate a respective sub-image which is passed to the processor, each of the two sub-images corresponding to a different portion of the first and second regions.

8. An optical displacement sensor according to claim 7 in which the sub-images are captured at the same instant in time, or at substantially the same instant in time.

9. An optical displacement sensor according to claim 1 in which the processor further includes:
   a means for identifying the orientation of the edges by identifying the position of an inner portion of a first edge of the modulating regions in a first image and the position of an outer portion of the first edge in a second image;
   a means for identifying the position of an inner portion of a second edge of the modulating regions in the first image and the position of an outer portion of the second edge from the second image;
   an orientation determining means for determining the orientation of the first and second edges of the modulating regions from the relative positions of the portions in the first and second images; and
   a position determining means for determining the position of the centre of the modulating element from the determined orientation of the first and second identified edges of the modulating regions.

10. An optical displacement sensor according to claim 9 in which the processor is adapted to determine the centre of rotation of both of the first and the second elements by identifying the orientation of at least two edges on each of the elements.

11. An optical displacement sensor according to claim 1 in which each first region of the first and second modulating elements comprises a radially extending slot formed between circumferentially spaced radially extending edges.

12. An optical displacement sensor according to claim 11 in which the second regions between the slots are opaque.

13. An optical displacement sensor according to claim 1 in which the spatial extent of the two-dimensional array is such that, in use, at least five transitions between first and second intensity thresholds will always be detactable by each array.

* * * * *

UNITED STATES PATENT AND TRADEMARK OFFICE
CERTIFICATE OF CORRECTION

PATENT NO.    : 6,800,843 B2
DATED         : October 5, 2004
INVENTOR(S)   : Steven John Horton It is certified that error appears in the above-identified patent and that said Letters Patent is hereby corrected as shown below:

<u>Column 8,</u>
Line 21, after "claim" insert -- 5 --.

Signed and Sealed this

First Day of February, 2005

JON W. DUDAS
*Director of the United States Patent and Trademark Office*